(12) United States Patent
Jacobs et al.

(10) Patent No.: US 7,307,760 B2
(45) Date of Patent: Dec. 11, 2007

(54) RASTER IMAGE PATH ARCHITECTURE

(75) Inventors: William S. Jacobs, Los Angeles, CA (US); Martin E. Banton, Fairport, NY (US); David C. Robinson, Penfield, NY (US); John A. Moore, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 951 days.

(21) Appl. No.: 10/607,761

(22) Filed: Jun. 27, 2003

(65) Prior Publication Data

US 2004/0263908 A1 Dec. 30, 2004

(51) Int. Cl.
*H04N 1/40* (2006.01)
*G06K 9/34* (2006.01)

(52) U.S. Cl. .................. 358/2.1; 358/1.9; 358/3.21; 382/173; 382/177; 382/178; 382/179

(58) Field of Classification Search .......... 358/1.9, 358/2.1, 3.21; 382/173, 175, 176, 177, 178, 382/179, 180
See application file for complete search history.

(56) References Cited

U.S. PATENT DOCUMENTS

| | | | |
|---|---|---|---|
| 4,593,325 A * | 6/1986 | Kannapell et al. ......... 358/3.22 |
| 4,677,571 A * | 6/1987 | Riseman et al. ............. 358/1.9 |
| 5,687,303 A | 11/1997 | Motamed et al. ........... 395/117 |
| 5,848,198 A * | 12/1998 | Penn ........................... 382/276 |
| 6,256,104 B1 | 7/2001 | Rumph et al. ............. 358/1.15 |
| 6,307,962 B1 * | 10/2001 | Parker et al. ................ 382/170 |
| 6,327,043 B1 | 12/2001 | Rumph et al. ............. 358/1.15 |
| 6,429,948 B1 | 8/2002 | Rumph et al. ............. 358/1.15 |
| 6,542,173 B1 | 4/2003 | Buckley ...................... 345/841 |
| 7,103,221 B2 * | 9/2006 | Ohta et al. .................. 382/173 |
| 2002/0097419 A1 * | 7/2002 | Chang et al. .............. 358/1.13 |
| 2004/0234148 A1 * | 11/2004 | Yamada ....................... 382/250 |

* cited by examiner

*Primary Examiner*—King Y. Poon
*Assistant Examiner*—Steven Kau
(74) *Attorney, Agent, or Firm*—Oliff & Berridge, PLC

(57) ABSTRACT

A raster image path architecture having the capacity for supporting the rendering and output of a device-independent grayscale raster image, while also offering the capacity for supporting the rendering and output of a device-dependent binary raster image, thus offering the advantages of outputting a device-independent grayscale raster image while preserving the performance and image quality advantages of a conventional binary raster image path architecture.

3 Claims, 7 Drawing Sheets

RASTER IMAGE PATH ARCHITECTURE

The present invention is directed to systems and methods for optimized image reproduction, and in particular to an improved raster image path architecture.

Conventional monochrome raster image path architectures are known to capture pages as either device-dependent binary raster images or as device-independent grayscale raster images. For example, monochrome raster image path architectures can capture pages as either device-dependent binary raster images in the form of TIFF 6.0 CCITT Group IV files or as device-independent grayscale raster images in the form of a JPEG compressed format such as JFIF. Images are typically scanned as grayscale (multiple bits per pixel) raster images and immediately converted into device-dependent binary (one bit per pixel) raster images that are targeted for optimal output on a specific print engine. As the characteristics of different print engines vary, so too will each device-dependent binary raster image vary. Factors such as whether the target print engine writes white or black, has minimal permissible line width, offers different tone reproduction curves, has availability of particular halftone screens, and employs error diffusion to minimize moiré, will affect the makeup of a particular raster image file destined for use in a particular print engine.

In a process known as segmentation, typically performed after scanning, image data is analyzed and separated into different regions, each of which being rendered to binary so as to print optimally on the intended ("target") print engine. Using various lossless compression algorithms, the resulting image files can be relatively small.

Although such device-dependent binary raster image files can be used for printing of rendered images having high image quality, with such image files being optimized for an targeted print engine, the rendering and printing of such device-dependent binary raster images on print engines other than the targeted print engine can result in significant image quality degradation.

In contrast, preserving the raster images in a device-independent fashion as grayscale images can be useful. Device-independent grayscale raster images can be sent to one or more differing print engines in a printing system so as to be rendered and printed with minimal image quality degradation. However, such rendering can require a very significant amount of print controller processing. If this requirement is unmet, the performance of the printing system will suffer.

Furthermore, the file size of a device-independent grayscale raster image can be exceedingly large and in order to compensate for such file size, a device-independent grayscale raster image is usually compressed. The typical compression algorithm applied to a device-independent grayscale raster image is lossy, and the image quality of the resulting compressed image file is thereby degraded.

It has been proposed to use of mixed raster content (MRC) image files, or the image data format known as TIFF FX Profile M, which supports multiple planes of image data.

Unfortunately, only the most recently designed high-end print controllers are able to efficiently process MRC image files. Hence, using such files requires the development of a raster image path architecture that effectively offers a solution to not only the requirement for rendering and printing image files prepared for modern, high-and print controllers, but also files prepared for legacy printing systems.

Accordingly, there remains in the art a need for a raster image path architecture that has the capacity for supporting the rendering and printing of a device-independent grayscale raster image, while also offering the capacity for supporting the rendering and printing of a device-dependent binary raster image. Such an architecture would therefore provide the advantages of printing a device-independent grayscale raster image while preserving the performance and image quality advantages of a conventional binary raster image path architecture.

According to the present invention, an improved raster image path architecture may be implemented according to the present invention for improved rendering and outputting of an image file. The embodiments described herein refer to output of image files on an output device in the form of a print engine in a printing system, but the references to such print engine as output devices are exemplary and are not to be limiting.

In a first aspect of the present invention, a raster image path architecture is provided for:
  (1) capturing a source image to provide a device-independent grayscale image data;
  (2) generating the associated segmentation information needed for optimal rendering of the image data as a binary image;
  (3) determining a target output device and using the segmentation information to convert the device-independent grayscale image to a binary raster image optimized for the targeted output device; and
  (4) submitting the device-dependent binary raster image to the targeted output device.

In another aspect of the present invention, a MRC-based raster image path architecture is provided for generating and storing device-independent N-plane MRC grayscale raster image data, which can be either sent unaltered to a modern monochrome print controller, or can be converted to an appropriately-optimized, binary, device-dependent raster image file useful for effective printing on legacy monochrome and color machines. The contemplated MRC-based image path architecture may operate according to the following:
  (1) capturing a source image to provide a device-independent grayscale image data;
  (2) generating the associated segmentation information needed for optimal rendering of the image data as a binary image;
  (3) applying the associated segmentation information to create a device-independent N-plane MRC image file, having lower level planes for supporting a binary image representing any black text and line art, and having overlay planes for supporting grayscale overlays;
  (4) storing the device-independent N-plane MRC raster image file;
  (5) determining a target print engine having a print controller and determining whether the print controller can effectively process the N-plane MRC image;
  (6) if the print controller is determined to be capable of effectively processing the N-plane MRC image, then the N-plane MRC image is submitted to the print controller;
  (7) if the print controller is determined not to be capable of effectively processing the N-plane MRC image, the grayscale overlay planes are appropriately rendered and the image layers are flattened, thus yielding a single device-dependent binary raster image file that is optimized for the targeted print engine, which then is submitted to the targeted printer.

In another aspect of the present invention, the conversion from a device-independent grayscale format to a device-dependent binary format can be deferred until such time as the actual targeted output device, such as a specific print engine, is known. At such time of conversion, the information needed to perform the optimal conversion will be available, and the resulting device-dependent binary image will therefore offer a high level of image quality when outputted by the targeted output device. Furthermore, the print controller will be processing a binary raster image, and will be as efficient as if the conversion from grayscale to binary formats had been performed at the time of scanning.

In another aspect of the present invention, the proposed raster image path architecture enables a novel flexibility for retargeting an image file stored in a device-independent format (which incorporates both grayscale image and pre-served image segmentation data), yet nonetheless offers the image quality and productivity afforded by the conventional device-dependent binary image format.

In another aspect of the present invention, the contemplated raster image path architecture uses the MRC format to support a structured grayscale image based upon segmentation data, while preserving the image quality and productivity of the conventional device-dependent binary image model on legacy monochrome and color printers.

In another aspect of the present invention, the contemplated raster image path architecture captures images by creating and storing device-independent grayscale raster images together with the segmentation information needed for their later conversion to device-dependent binary raster images that are optimized for specific printers.

In another aspect of the present invention, the segmentation information may be computed at an intermediate platform to convert re-targetable device-independent grayscale raster images to targeted device-dependent binary raster images In another aspect of the present invention, the conversion of the device-independent grayscale raster images and their associated segmentation information to targeted device-dependent binary raster images may be reserved for implementation by an intermediate compute platform after the targeted print engine has been selected.

In another aspect of the present invention, image data formed by creating and storing device-independent N-plane MRC grayscale raster images can preserve key segmentation information.

In another aspect of the present invention, an intermediate compute platform may be used to determine the segmentation information inherent in the device-independent N-plane MRC grayscale raster images for converting these re-targetable images into targeted device-dependent binary raster images In another aspect of the present invention, conversion of the device-independent grayscale raster images and their associated segmentation information to targeted device-dependent binary raster images may be performed by an intermediate compute platform when a selected targeted is unable to process (or unable to process efficiently) N-plane MRC grayscale raster images.

For a general understanding of the present invention, reference is made to the drawings. In the drawings, like reference numerals have been used throughout to designate identical elements.

The invention is described herein with reference to one or more embodiments. However, it will be understood that there is no intent to limit the invention to the embodiment(s) described. On the contrary, the intent is to cover all alternatives, modifications, and equivalents as may be included within the spirit and scope of the invention as defined by the appended claims.

The raster image path architecture implemented according to the present invention allows users to create and store device-independent grayscale raster image files (thereby providing image file portability) which, before printing, are optimally rendered as device-dependent binary raster images, thereby providing high performance printing of images having high image quality.

A notable feature in the contemplated raster image path architecture is that segmentation information is generated and stored during image capture, but such segmentation information is retained until the targeted print engine is known, whereupon the segmentation information is utilized to render the raster image for printing on the targeted print engine.

Figure 1:
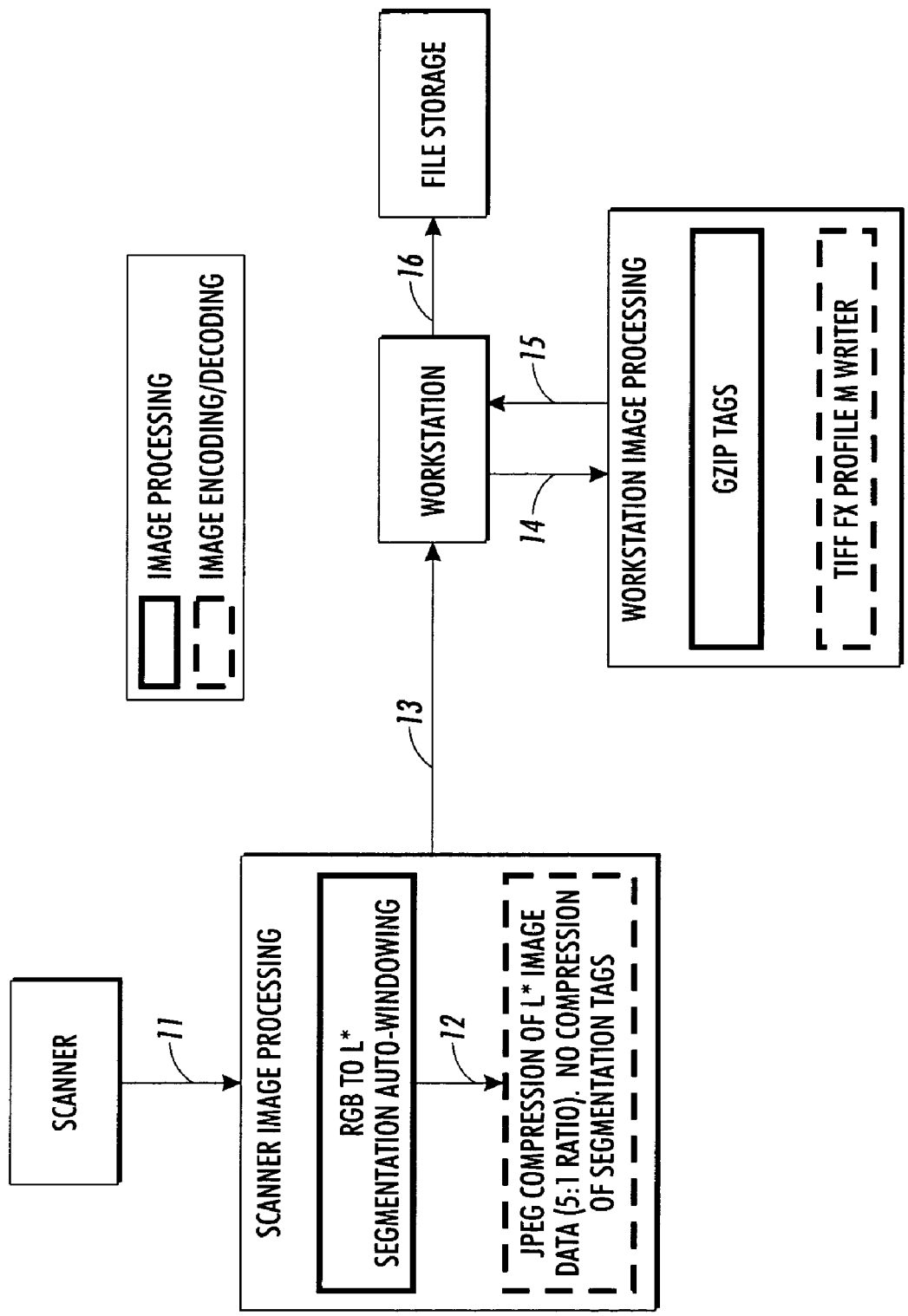
FIGS. 1 and 2 illustrate a first preferred embodiment of a raster image path architecture implemented according to the present invention.
Figure 2:
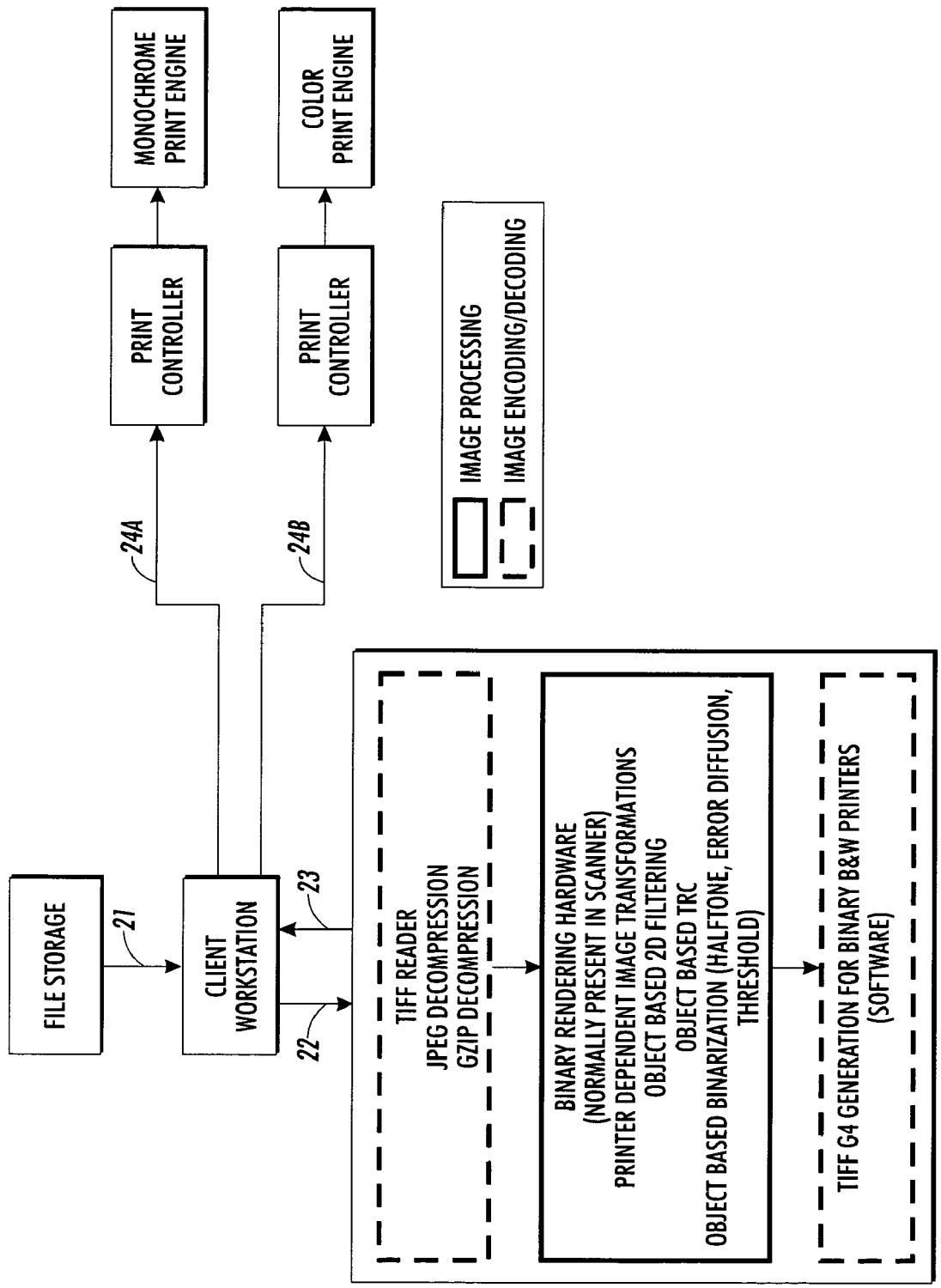

With reference now to FIGS. 1 and 2, an embodiment of a raster image path architecture may be understood to be implemented generally according to the following method steps:

In step 11, documents are scanned to produce device-independent grayscale raster images. The resulting grayscale raster images are analyzed and segmentation information is generated. However, instead of being immediately applied to produce a device-dependent binary raster image a specific print engine, the segmentation information is preserved as tags which accompany the grayscale raster image data.

In step 12, the device-independent grayscale image data is compressed with a lossy compression so as to be visually lossless when the image is decompressed. The tags are compressed in step 14 using a lossless compression algorithm. The results of the processing in steps 12 and 14 are provided in step 15 to the workstation and optionally to a suitable storage device in step 16 for storage until the respective image is to be printed.

When the user chooses to print the document, a printer (having a specific print engine) is selected. The device-independent grayscale image data and its associated segmentation tag information are retrieved from storage in step 21 and provided to a client workstation. Using the segmentation information generated by step 12, the grayscale image data is processed in step 23 as if it were being rendered by a scanner generating device-dependent binary images. Thus, each device-independent grayscale image is converted in steps 22 and 23 to a binary raster image that is optimized for the selected (targeted) print engine.

The resulting device-dependent binary raster image data is then available to be submitted in step 24A or step 24B to its targeted print engine, either embedded within a Postscript submission file or as a separate image file referenced from a Postscript file. The respective print controller for the selected print engine can process the device-dependent binary raster image with high performance.

Because the conversion from device-independent grayscale to device-dependent binary is deferred until such time as the targeted print engine is known, and because the most relevant information needed to optimally perform the conversion will then be available, the resulting device-dependent binary image will support high levels of image quality. For example, the same firmware rendering application-specific integrated circuits (ASICs) may be employed in the workstation as would be employed in a typical scanner, overall image processing performance will not suffer. Further, because the print controller will process a binary raster image, the rendering and raster image processing will be as efficient as if the conversion from grayscale to binary had been performed at the time of scanning a source document.

Certain variations in the illustrated implementation are possible. For example, instead of capturing RGB, as shown in FIG. 1, only the green channel could be used directly to generate 8 bit grayscale images While this could reduce the bandwidth between the scanner and the image processing, the downside would be the loss of certain features such as conversion of color to patterns that preserve much of the color information even when printed on a black-only printer.

Also, instead of converting the portable device-independent grayscale image to a device-dependent binary image by means of hardware in the scanner, this conversion could be performed either on the client workstation in software or in firmware executing on a more general purpose hardware accelerator. An additional cost-saving alternative for the conversion might be the implementation of looping the device-independent raster image files back to the rendering ASICs in a scanner.

Figure 3A:
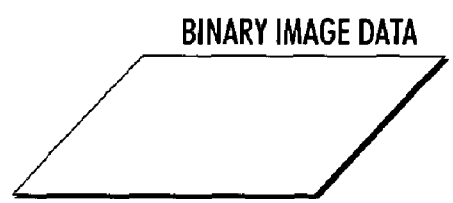
FIGS. 3A-3D illustrate a variety of ways that may be employed for storage of the image data and tag information generated in the raster image path architecture of the present invention.
Figure 3B:
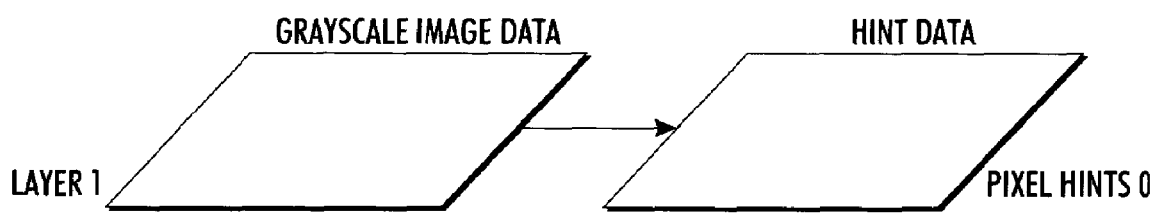
Figure 3C:
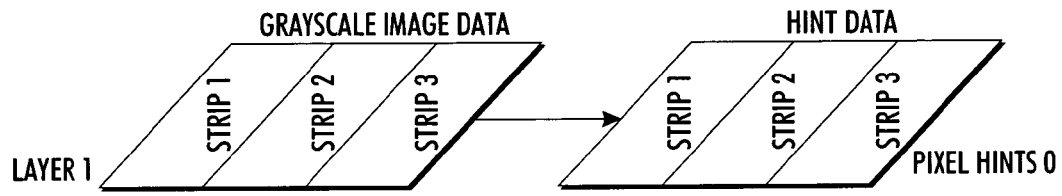
Figure 3D:
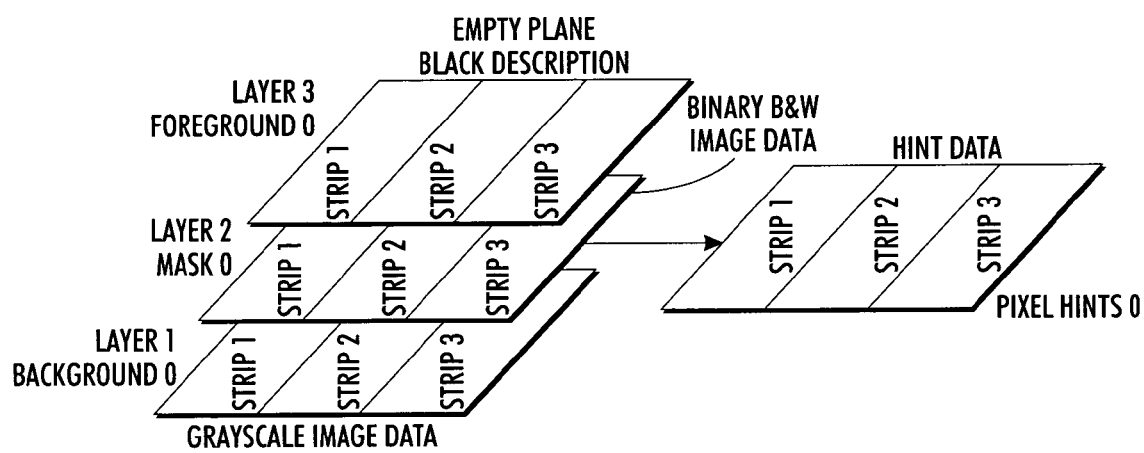

With reference now to FIGS. 3A-3D, there is illustrated a variety of image planes arrangements that may be employed for storage of the image data and tag information. (Note that the segmentation tags generated in step 12 can be saved without any additional processing, or be converted into a more general type of information called hints.) As shown in FIG. 3A, for example, a device-dependent data file may be supported in a single strip of binary image data; or as shown in FIG. 3B, as a device-independent file in a single-strip, single JPEG compressed grayscale image plane plus a hint plane, file consisting of a single strip of JPEG compressed image data together with an additional plane of hint information, with the hints being used to store the segmentation information generated by the scanner. As shown in FIG. 3C, a device-independent data file is shown in a multiple strip, compressed grayscale image plane plus a hint plane. As illustrated in FIG. 3D, a device-independent data file is shown in at least two image planes with a selector plane and a hint plane. FIGS. 3C-3D represent how the planes of device independent data and the associated rendering hints may be stored for a variety of reasons such as rendering productivity.

Figure 4:
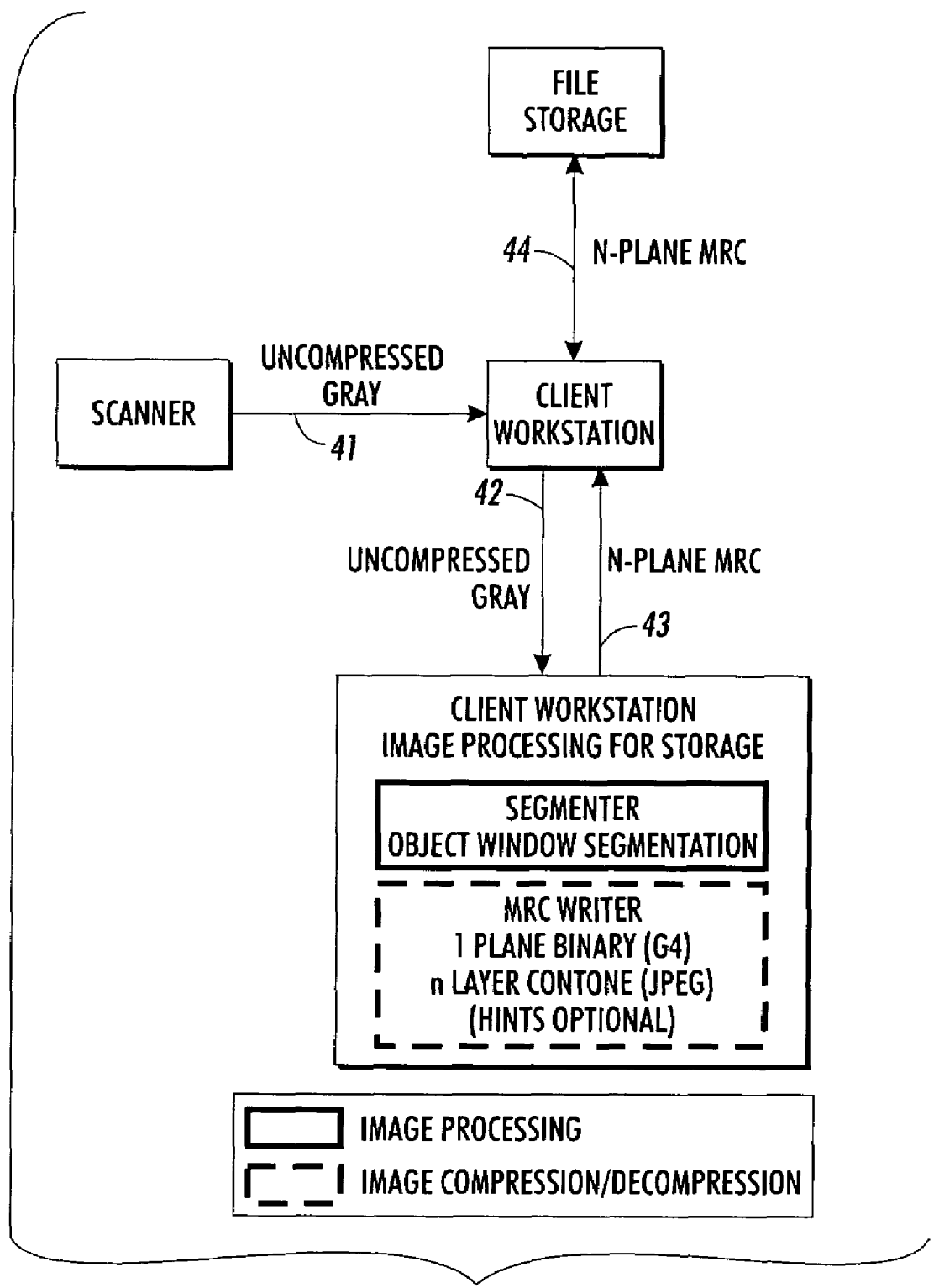
FIGS. 4-6 illustrate respective additional embodiments of the raster image path architecture that may be implemented to create and store device-independent N-plane MRC grayscale raster images.
Figure 5:
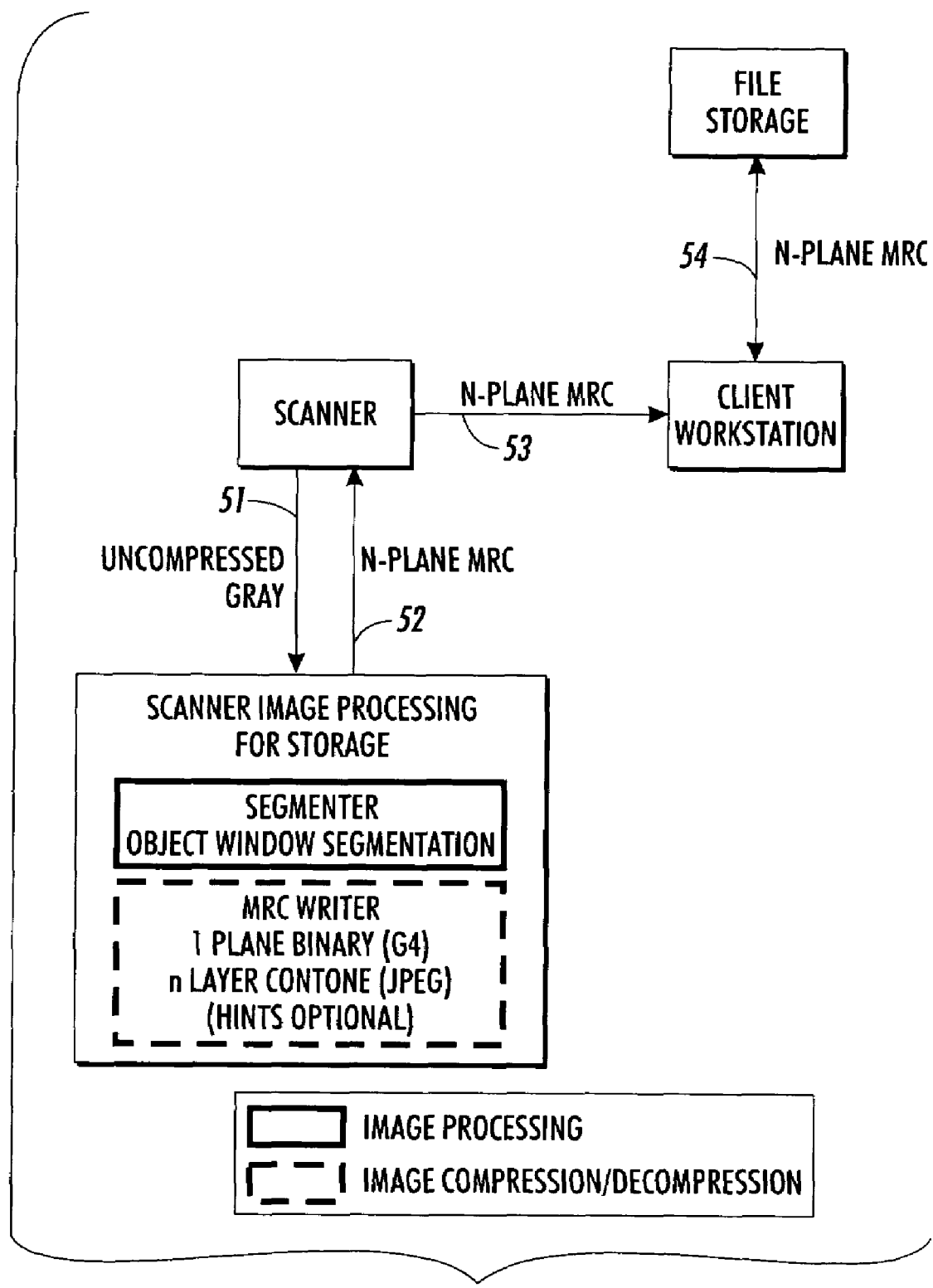
Figure 6:
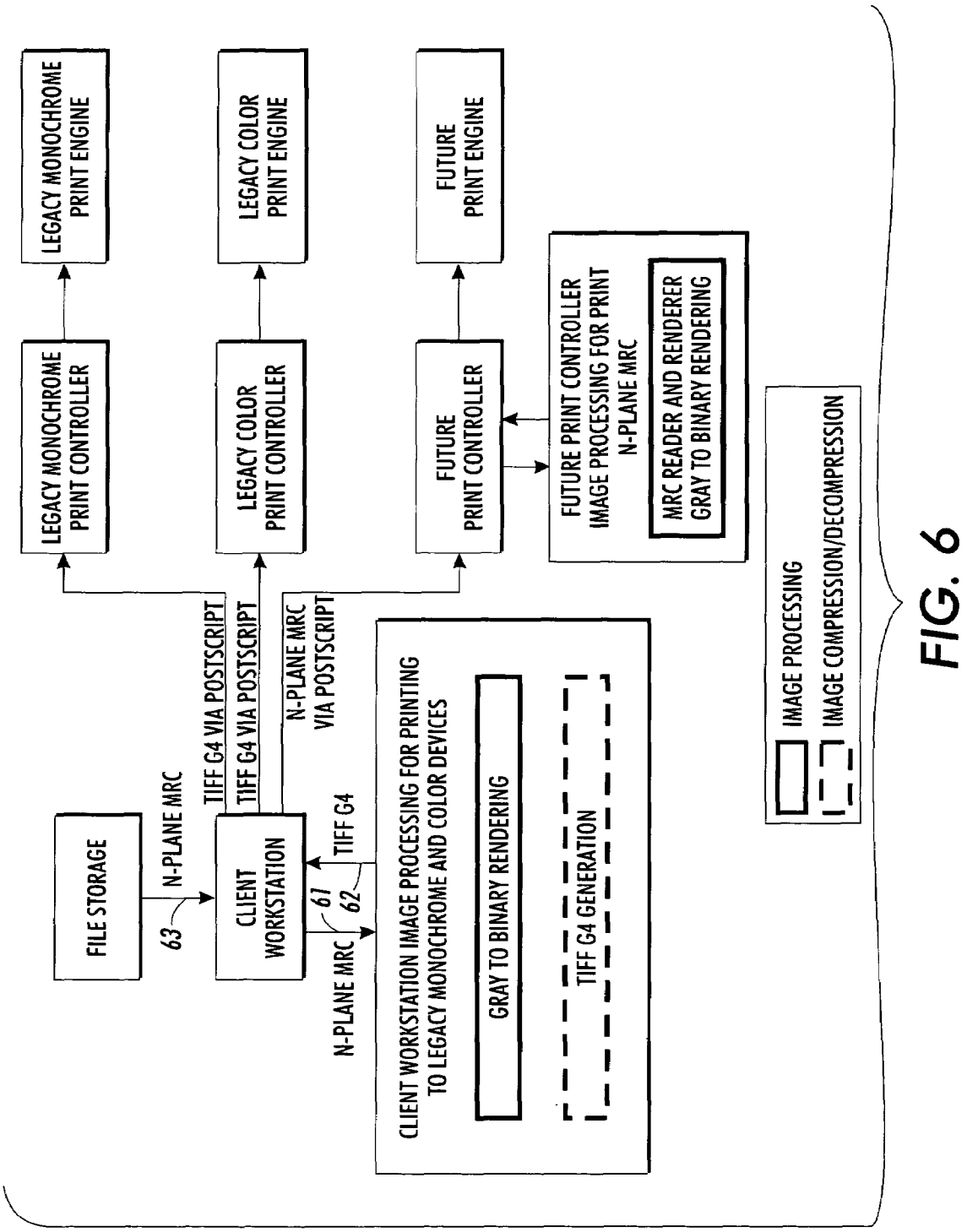

As illustrated in FIGS. 4-6, embodiments of the contemplated raster image path architecture may be implemented to create and store device-independent N-plane MRC grayscale raster images, which, before printing, can be optimally rendered as device-dependent binary raster images, thereby resolving image portability and image quality problems, and the performance concerns inherent in use of legacy printing systems.

After image capture is performed, segmentation information may be generated and used to create a high quality representation of black and white text stored in the lowest foreground, background, and selector planes and N-planes of grayscale objects represented as additional levels of foreground and selector planes. Because the MRC image selector planes preferably use lossless binary compression, they can preserve the sharp edges of text and line art in the captured image, thereby improving image quality. Also, by segregating the grayscale objects into multiple planes, image segmentation information will be preserved.

The contemplated MRC-based raster image path architecture may be implemented as follows:

As illustrated in FIG. 4, documents are first scanned to produce in step 41 one or more device-independent grayscale raster images. The process may involve either use of a clear filter and the scanner's green channel or use of a three-channel RGB color image which is then converted to L*. In either case, a multiple bit per pixel grayscale image is delivered in step 42 to an image processing module so as to be analyzed and for segmentation information to be generated. The segmentation information is used to create an N-plane multiple plane MRC image provided to the workstation in step 43. The lowest level foreground, background, and selector planes are used to store a high quality representation of any black or white text in the image. Additional levels of foreground and selector planes are used to segregate different grayscale objects into their own layers. As a alternative option, the segmentation information also can be used for additional purposes, e.g., to suppress background, or to perform a descreen procedure. Such improvements to the background and the results of descreening will allow the file to be compressed to a smaller file size.

As illustrated in FIG. 5, segmentation and file generation can occur according to steps 51, 52 in the scanner (in which case the scanner sends N-plane MRC images to the client workstation in step 53) or in the client workstation (in which case the scanner sends the uncompressed grayscale image in step 53 to the client workstation, where it is segmented and an N-plane MRC image is generated). In the latter case, as another possible alternative, in lieu of sending a grayscale image to the client workstation, the scanner may transmit a full contone image, with the client workstation itself generating the grayscale image, i.e., converting the scanned RGB image to an L grayscale image.

The device-independent N-plane MRC grayscale images are stored in steps 44, 54 in a file storage device until needed for printing. As illustrated in FIG. 6, when an image is chosen for printing, a printer having a specific print engine is selected. It is also determined whether the printer's controller is able to process the N-plane MRC images efficiently.

For those certain print controllers that cannot efficiently process a device-independent N-plane MRC grayscale image, the client workstation will deliver in step 61 (before print submission) the N-plane MRC grayscale image to an image processing module for converting the stored images into appropriately targeted device-dependent binary images which are returned to the client workstation in step 62 and for storage in step 63 to file storage. Since the N-plane MRC raster image structure preserves the segmentation information, it then can be used to generate a binary raster image that is optimized for the selected print engine. Because the N-plane MRC images use window-based segmentation, they can be rapidly rendered into binary and the N-planes can be flattened into a single raster image. When the resulting device-dependent binary images are submitted to the print controller for the targeted print engine, (embedded, for example, within a Postscript submission file, or presented as a separate image file referenced from a Postscript file) they will be rapidly subjected to raster image processing and then are printed on the respective one of the legacy monochrome print engine, legacy color print engine, or future (i.e. modern or beyond) print engine.

When submitting device-independent N-plane MRC grayscale images to a modern, high-end print controller that offers the special support used for effectively processing such a format, the client workstation need not first convert the images to device-dependent binary images. Hence, in this case, without additional workstation processing, device-independent N-plane MRC grayscale images will be submitted to the targeted printer's controller, either embedded within, for example, a Postscript submission file or as separate image files referenced from a Postscript file. In either case, the print controller then will efficiently raster image process the device-independent N-plane MRC grayscale image for the target printer. The processing can be done in software in the main processor of the printer controller or by the use of accelerator cards designed to handle N-plane MRC grayscale images and the associated hints/segmentation tags.

For modern printing systems having, MRC-capable print controllers, the use of N-plane MRC grayscale raster image files will offer improvements in image file portability, image quality, and print system performance. For all other printing systems, because the conversion from device-independent grayscale to device-dependent binary will be deferred until such time as the actual targeted print engine is known and because the information needed for optimal conversion will then be readily available, the resulting device-dependent binary image will support a high level of image quality. Also, because the print controller will be processing a binary raster image, the rendering and raster image processing will be as efficient as if the conversion from grayscale to binary had been performed at scan time.

The contemplated image path architecture does not require that hint data be provided with the stored N-plane MRC grayscale raster image data. If the scanner is used to generate such data, the hint data can be used to significantly improve image quality. However, the availability of hint data is a complementary but not an essential part of the contemplated architecture. Additionally, in a printer controller with sufficient processing capability (provided, for example, by a high performance main processor, or by use of an accelerator card), the segmentation data can be generated in the print controller immediately preceding printing.

Optionally, when taking advantage of high-performance print controller, the N-plane MRC grayscale raster image can be organized into multiple strips of image and optional hint data.

As a further optional optimization step, the generated device-dependent binary images may be cached for later reuse.

The examples described herein of the specific file formats used to represent the device-independent N-plane MRC grayscale raster image data are not intended to be limiting; for example, a variety of file formats such as TIFF FX Profile M, the JPM format of JPEG 2000, or PDF might be used.

Furthermore, while the contemplated raster image path architecture has been described with reference to a monochrome path, the teachings herein are readily and advantageously extendable to an improved raster image path architecture operable for color as well as simple grayscale scanned images.

Accordingly, as will be appreciated by those skilled in the art, because the scanner and workstation generate the device-independent grayscale raster images and subsequently the workstation converts them to device-dependent binary raster images, the contemplated image path architecture is useful for use with both legacy and modern print engines. Further, the ability of a selected printer to process device-dependent binary images becomes an issue that is effectively independent of whether those images are generated during capture by a scanner, or later, at the time of printing by the workstation.

What is claimed is:

1. A method for implementing a raster image path architecture, comprising the steps of:
   (1) capturing a source image so as to provide device-independent grayscale image data;
   (2) generating associated segmentation information useful for optimal rendering of the device-independent grayscale image data as binary image data;
   (3) applying the associated segmentation information to create device-independent N-plane MRC image data;
   (4) determining a target print engine having a print controller and determining whether the print controller can effectively process the device-independent N-plane MRC image data;
   (5) in response to a determination that the print controller is capable of effectively processing the device-independent N-plane MRC image data, submitting the N-plane MRC image data to the print controller; and
   (6) in response to determination that the print controller is not capable of effectively processing the device-independent N-plane MRC image data, rendering grayscale overlay planes and flattening image layers, thus yielding device-dependent binary raster image data and submitting the device-dependent binary raster image file to the print controller.

2. The method of claim 1, wherein the N-plane MRC image file further comprises a plurality of planes for supporting binary images and a plurality of planes for supporting a grayscale images.

3. The method of claim 1, further comprising the step of storing the device-independent N-plane MRC raster image file.

* * * * *